Oct. 9, 1928.
J. P. MADDEN
1,687,343
METAL TANK JOINT CONSTRUCTION
Filed Nov. 6, 1922
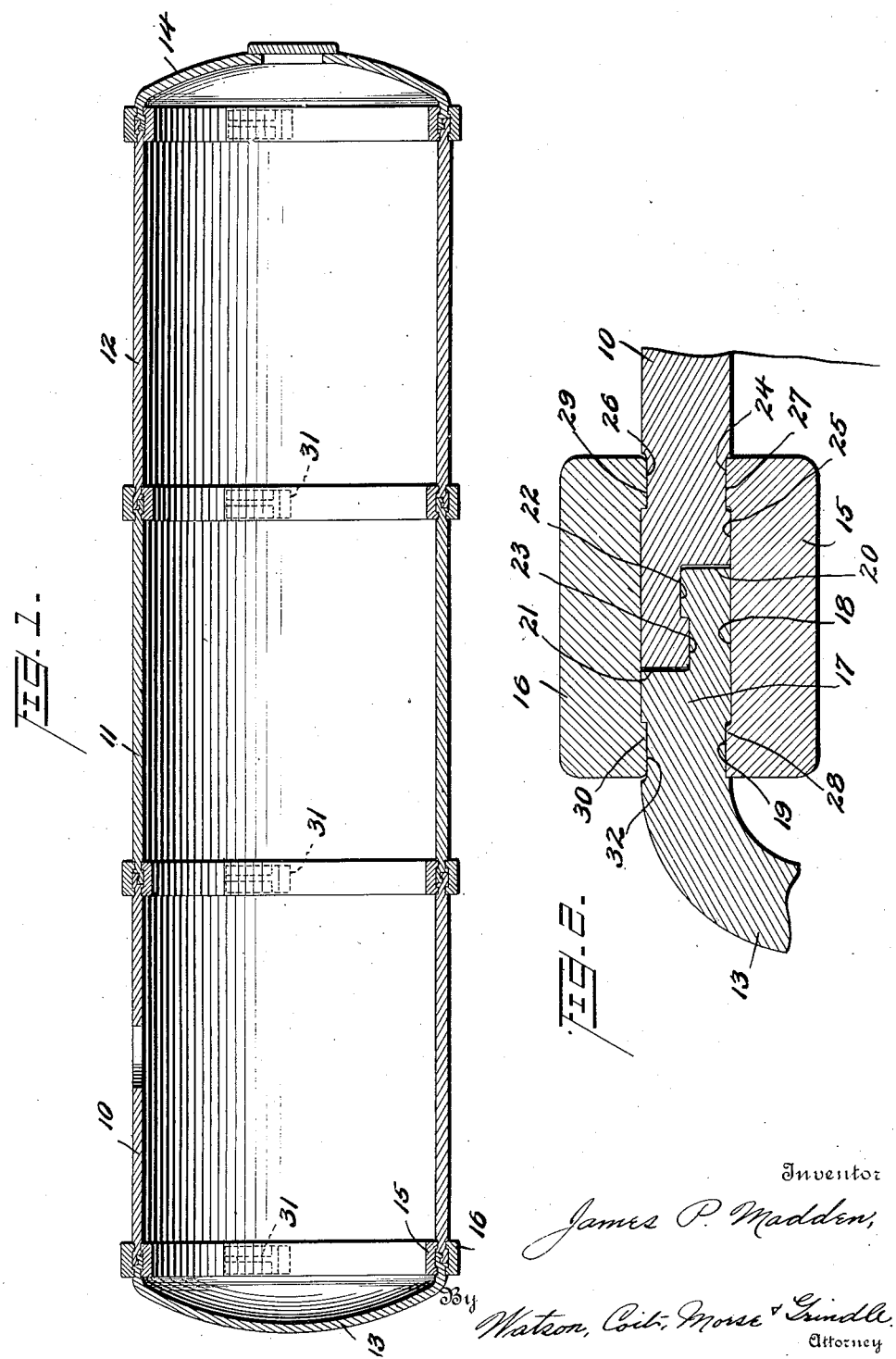
Inventor
James P. Madden,
By Watson, Coit, Morse & Grindle.
Attorney Patented Oct. 9, 1928.

1,687,343

UNITED STATES PATENT OFFICE.

JAMES PATRICK MADDEN, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

METAL-TANK-JOINT CONSTRUCTION.

Application filed November 6, 1922. Serial No. 599,411.

This invention relates to the construction of metal tanks and particularly to the joints for securing the ends in place and for securing adjacent sections together. It was designed primarily for use in making large steel tanks to be used in processes for distilling hydro-carbon oils where the tanks are subjected to high radial and longitudinal stresses due to the internal pressure of the contents and variations in temperature but it is, of course, adapted for other uses. These tanks are usually of large dimensions composed of steel having considerable thickness and are necessarily built up by joining a number of different sections and parts, and it has been found that it is very difficult to obtain an oiltight joint between parts and sections which stand the strains of use and the corrosive action of the hydro-carbon oils and their by-products and that riveting or welding are not entirely satisfactory. The present invention is intended and adapted to produce an oiltight and very strong and lasting joint for such tanks and others without the use of rivets or welding by integral continuous means extending entirely around the tank and including radially facing interlocking closely fitting contact surfaces of the metal of the tank sections continuously pressed together radially. The novel features of the invention will be more fully understood from the following description and claims taken with the accompanying drawing.

In the drawing:

Fig. 1 is a longitudinal section of a tank embodying the invention; and

Fig. 2 is a longitudinal section through one of the joints at the end of the tank including the novel features of the present invention.

As will be seen by reference to the drawing, the particular tank embodying the invention shown for purposes of illustration includes a number of cylindrical sections 10, 11, 12 arranged end to end and heads or end closures 13 and 14 which are curved in section outwardly from their margins to their centers and have edge portions in alignment with the sections 10, 11 and 12. The sections 10, 11 and 12 and the heads 13 and 14 are preferably seamless steel forgings rough machined to the general dimensions shown. Where the end or edge portions of the sections join each other longitudinally there are inner and outer rings overlapping the joint having materially greater width than thickness and consisting of continuous steel forgings rough machined to general dimensions.

Considering now the joint between the section 10 and the head 13 including the inner ring 15 and the outer ring 16 it will be noted that the edge portion 17 of the head 13 is machine finished on its inner face 18 in cylindrical form except that a groove 19 is formed near its inner edge and this groove is comparatively wide but has small depth and its base is parallel to the cylindrical portion 18. The edge portion 17 is reduced in diameter or thickness on its outer side from its end 20 to the line 21 and the outwardly facing surface of the reduced portion is in the form of what may be called a collar 22 and a groove 23, the collar being at the outer end portion and the groove at the inner portion of the thinner part. These surfaces are, of course, machine finished and smooth. The edge portion of the section 10 is machine finished and its diameter or thickness is reduced from the inner side just as the end 17 of the head was decreased from the outer side whereby the inner face of its end portion of reduced thickness will have a groove in which the collar 22 of the end 17 will fit and will have an end collar fitting in the groove 23 formed in the reduced portion of the head. The lower or inner surface of the section 10 next to the reduced portion is machined to form a groove 24 leaving a collar 25 between it and the reduced portion and the outer surface is similarly machined to form an outer groove 26 corresponding to the inner groove 24 in size and position. The upper or outer surface of the edge portion 17 of head 13 next to the reduced portion is machine finished forming a groove 32 and leaving a collar between it and the reduced portion and the inner surface is similarly machine finished forming the groove 19 corresponding to groove 32 in size and position.

The inner ring 15 is machine finished on its outer surface forming collars 27, 28 along its edges, these collars being of such size and form as to closely fit in the grooves 24 and 19 in the overlapping edge portions of the head and section 10 and the outer surface between those grooves closely fits the inner faces of these edge portions. The outer ring 16 is so machined as to form collars 29, 30 along its edge portions of such height and width as to match and fit in the grooves 32 and 26 with the intermediate portion between those collars closely fitting the outer surface of the edge portion of the head and the edge of section 10.

The outer surfaces of the collars 27 and 28 of the inner ring and the outer surface of the portion between those collars normally have slightly larger diameters than do the bottoms of the grooves 19 and 24 and the surface between them so that in assembling the parts after they are formed the head portion is heated until it expands sufficiently to permit its cylindrical edge portion 17 to pass over the collar 28 on ring 15 to the position shown in Figure 2 and on cooling it will contract and its inner surface will then engage the inner ring 15 under tension and the inner ring will be under compression. The normal diameters of the inner faces of the collars and groove on the reduced end portion of the section 10 are less than the normal diameters of the outer surfaces of the collar and groove on the reduced end of the head portion 17 so that in bringing the head into operative relation to the section 10, section 10 is heated until its end portion has expanded sufficiently to permit it to be moved endwise into its assembled position, the collar 23 on its reduced portion passing over the collar 22 on the reduced portion of the head. Upon cooling it will contract into close engagement with the outer surface of the overlapping part of the head portion and the inner ring 15. The normal diameter of the inner surfaces of the collars 29 and 30 on the outer ring and of the intermediate surface of that ring are slightly less than the normal diameters of the bottom surfaces of the grooves 32 and 26 and the intermediate outer surfaces of the head and section 10 and therefore in order to move it into position over the assembled parts from the end of the tank it is heated until expansion makes its diameter large enough to allow it to pass over the outer surface of the head and section until its collars are in position to enter the grooves when it contracts. When it does contract it neutralizes or relieves the tension on the portion 17 of the head and on the end of section 10 due to the pressure of the inner ring but it may somewhat increase the pressure on the inner ring. It is preferable that the width of the collars shall be slightly less than the width of the grooves in which they fit in the connection between the rings and the overlapping end portions so as to permit slight movement due to expansion.

It will be noted that in this construction there are surfaces of the material constituting the tank sections facing each other radially and held under continuous pressure due to the tension of the metal which in turn is due to the difference in the diametric dimensions of the surfaces in contact. The smooth machine finished closely fitting contact surfaces of unusually large area tightly and constantly pressed together very effectively prevent the escape of the contents of the tank between them and thus make the joint airtight and oiltight. The inner and outer overlapping rings and the interlocking collar and groove construction serve to make a joint which is very strong and lasting and which will be amply able to stand all of the strains to which it may be subjected in use and which will not become ineffective through corrosion. It will be understood that each joint between sections of the tank has the same structural characteristics as that described, and is assembled in the same way. The tank may be supported by brackets 31 shown in dotted lines, fastened to the outer rings 16.

Although one specific embodiment of the invention has been shown for purposes of illustration, it will be understood that it is not limited to that form beyond what is called for in the claims.

Having thus described the invention what is claimed as new and desired to be secured by Letters Patent is:

1. A metal tank comprising in combination adjacent tank sections continuous around the tank having a liquid-tight joint of great strength connecting them including contact surfaces formed from the metal of said sections closely fitting each other radially and longitudinally interlocked and continuous rings on the inner and outer sides lapping the joined ends of said sections having surfaces of contact so formed as to closely fit corresponding surfaces on said ends and longitudinally interlock therewith, the surfaces of contact being pressed together radially by the tension of the metal comprising said ends and the outer ring.

2. A metal tank comprising in combination two tank sections having abutting edge portions extending entirely around the tank, the said edge portions being correspondingly reduced in thickness respectively from their outer and inner sides with the reduced portions overlapping each other under radial pressure the outer surface of each being in alignment with the outer surface of the other section the contact surfaces of the reduced portions having corresponding interlocking depressions and projections preventing relative longitudinal movement, an inner and an outer continuous ring lapping and closely fitting the abutting edge portions, the outer ring being under tension and the inner ring under compression whereby said end edges are tightly clamped between them.

3. A metal tank comprising in combination two tank sections having abutting edge portions extending entirely around the tank, the said edge portions being correspondingly reduced in thickness respectively from their outer and inner sides with the reduced portions overlapping each other under radial pressure the outer surface of each being in alignment with the outer surface of the other section the contact surfaces of the reduced portions having corresponding interlocking depressions and projections preventing relative longitudinal movement, an inner and an outer continuous ring lapping and closely fitting the abutting edge portions the outer ring being under tension and the inner ring under compression whereby said end edges are tightly clamped between them, the fitting surfaces of said rings and end portions being provided with corresponding interlocking depressions and projections preventing relative longitudinal movement.

4. A metal tank comprising in combination two tank sections having abutting edge portions extending entirely around the tank, the said edge portions being of correspondingly reduced thickness from their outer and inner sides respectively for a fixed and material distance from their ends longitudinally the said reduced portions overlapping each other longitudinally with abutting end surfaces, the contact surfaces of the reduced portions having corresponding comparatively wide grooves at their inner ends and corresponding collars at their outer ends extending around them with the outer surface of the collar on one closely fitting the bottom surface of the groove on the other, inner and outer rings of material width lapping and tightly fitting the inner and outer surfaces of said abutting edge portions the surfaces of said rings and the corresponding and matching surfaces of said edge portions in contact therewith at the ends of the rings being in the form of corresponding collars and grooves of material width.

5. A metal tank comprising in combination two tank sections having abutting edge portions extending entirely around the tank, the said edge portions being of correspondingly reduced thickness from their outer and inner sides respectively for a fixed and material distance from their ends longitudinally the said reduced portions overlapping each other longitudinally with abutting end surfaces, the contact surfaces of the reduced portions having corresponding comparatively wide grooves at their inner ends and corresponding collars at their outer ends extending around them with the outer surface of the collar on one closely fitting the bottom surface of the groove on the other, inner and outer rings of material width lapping and tightly fitting the inner and outer surfaces of said abutting edge portions, the surfaces of said rings and the corresponding and matching surfaces of said edge portions in contact therewith at the ends of the rings being in the form of corresponding collars and grooves of material width, the said surfaces of contact between said overlapping edge portions and between them and said rings being constantly pressed together radially by the tension of the metal comprising them due to a normal difference in the diametric dimensions of the surfaces in contact.

6. A still, constructed of cylindrical body sections and dished end sections, said sections being connected one to another by hermatically sealed joints, each of said joints including an inner annular member in compression, lapping end portions of adjacent still sections forming intermediate members in tension, radially pressing on the inner member, and an outer annular member in tension radially pressing on the joint of the lapping sections.

7. A still, constructed of cylindrical body sections and dished end sections, said sections being connected one to another by hermetically sealed joints, each of said joints including an inner annular member in compression, lapping end portions of adjacent still sections forming intermediate members in tension, radially pressing on the inner member, and an outer annular member in tension radially pressing on the joint of the lapping sections, each of said members being provided with radial projections interlocking with a contiguous member to prevent distortion of the joint in a longitudinal direction.

In testimony whereof I hereunto affix my signature.

JAMES PATRICK MADDEN.